United States Patent [19]
Anderson et al.

[11] 3,789,674
[45] Feb. 5, 1974

[54] OPTICAL ACCELEROMETER

[75] Inventors: Matthew E. Anderson; James E. Means, both of China Lake, Calif.

[73] Assignee: The United States of America as represented by the Secretary of the Navy, Washington, D.C.

[22] Filed: Oct. 27, 1972

[21] Appl. No.: 301,541

[52] U.S. Cl.............................................. 73/517 R
[51] Int. Cl. .......................................... G01p 15/08
[58] Field of Search 73/516 R, 517 R, 517 B, 517 A, 73/71.1, 71.3; 250/216

[56] References Cited
UNITED STATES PATENTS

| | | | |
|---|---|---|---|
| 2,487,793 | 11/1949 | Esval et al.......................... | 73/517 R |
| 2,665,896 | 1/1954 | Kirby et al. ................... | 73/516 R X |
| 3,306,099 | 2/1967 | Kearns.............................. | 73/71.3 X |
| 3,432,671 | 3/1969 | Edmonds......................... | 250/216 X |
| 3,431,417 | 3/1969 | Chope.............................. | 73/71.1 X |

*Primary Examiner*—James J. Gill
*Attorney, Agent, or Firm*—Richard S. Sciascia; J. M. St. Amand

[57] ABSTRACT

A miniature device including a light source, a suspended mass, and a photocell system is employed as an optical accelerometer which serves as a transducer to provide an electrical signal proportional to the magnitude of acceleration and converts inertial forces into an electrical signal.

9 Claims, 2 Drawing Figures

Patented Feb. 5, 1974  3,789,674

OPTICAL ACCELEROMETER

BACKGROUND OF THE INVENTION

The present invention relates to acceleration responsive devices and particularly to an accelerometer that provides an electrical signal which is proportional to the magnitude of the acceleration on the device in the direction of its axis of sensitivity.

There are currently five basic types of accelerometers which perform the same type function as this invention; they are the servo, the differential transformer, the potentiometric, the wire strain gage, and the semiconductor strain gage types of accelerometers. Piezoelectric type transducers are typically used to measure acceleration due to shock or vibration and are inappropriate for measurement of continuous, slowly varying acceleration as are this invention and the above five prior types of accelerometers. All of the types that have been compared require an electrical power source and provide an analog electrical signal proportional to acceleration. The servo types utilize a pendulous mass attached to a servo motor. When the servo type device is subjected to acceleration, the electric current drawn by the servo to keep the pendulous mass in its null position is proportional to acceleration. This type is the most accurate of the group and is used in inertial guidance applications. Its primary disadvantage lies in its high cost which varies from a few hundred to a few thousand dollars each, depending upon the accuracy. The differential transformer type of accelerometer uses a magnetic seismic mass suspended between the windings of a differential transformer to act as a core. The output side of the transformer is connected into two opposing halves. As the seismic mass is displaced due to acceleration, the inductance of one coil increases and the other decreases, thus yielding a change in the electrical properties of the output circuit proportional to acceleration. These devices have the disadvantage of fairly high cost, on the order of several hundred dollars each. The potentiometric type of accelerometer utilizes a wiper contact attached to a seismic mass to act as a pick-off on a potentiometer. Here the electrical resistance is proportional to acceleration. Although this type of device can be made at low cost, it suffers from a reduced lifetime as measured in terms of number of cycles, due to wear of the wiper contacts. The wire strain gage type utilizes the change in electrical resistance of a wire which is either used to suspend a seismic mass or is attached to a beam which deflects under acceleration. This type of device has the disadvantage of a small "gage factor" or a very small change in percent of electrical resistance over its range of operability. The semiconductor strain gage type is similar in construction to wire gage type attached to the beam and it has a much higher "gage factor." But, it suffers from instability of the zero level at temperature extremes.

SUMMARY OF THE INVENTION

The present invention is a miniature device involving three main parts: a light source, a suspended seismic mass having a light reflective surface, and a photocell system. The optical accelerometer operates as a transducer to provide a signal proportional to the magnitude of acceleration, converting inertial forces to an electrical signal. This device offers a combination of advantages not found in prior type accelerometers, i.e., low cost, high accuray, long life due to elimination of sliding parts, small size, and ruggedness. The electrical signal is generated directly by the photocells; also, the photocells can be shaped to provide a signal that is proportional to acceleration.

Other objects, advantages and novel features of the invention will become apparent from the following detailed description of the invention when considered in conjunction with the accompanying drawing.

DESCRIPTION OF THE PREFERRED EMBODIMENT

Figure 1:
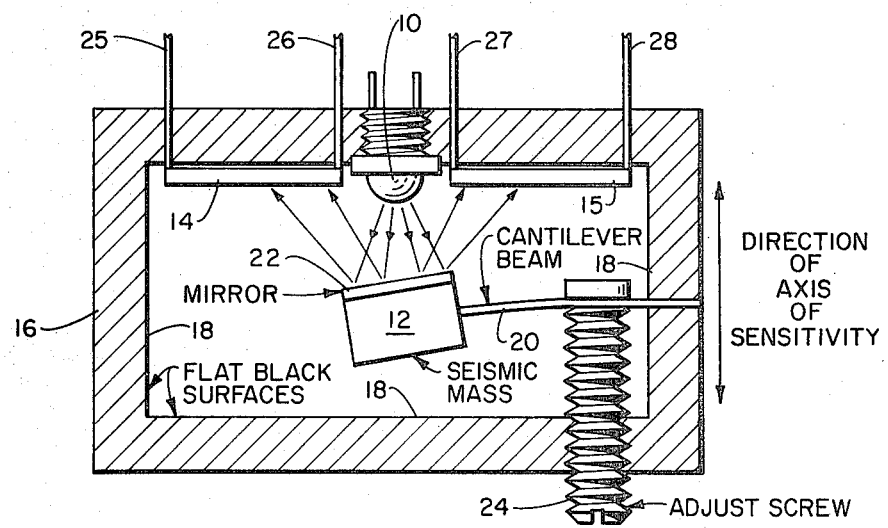
FIG. 1 is a cross-sectional view of a preferred embodiment of the optical accelerometer of the invention.
Figure 2:
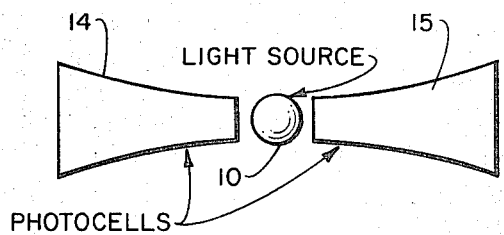
FIG. 2 shows the shape of the light collecting surfaces of the photocells in FIG. 1.

The optical accelerometer consists of primarily three basic parts: the light source 10, the suspended mass 12, and the photocells 14 and 15. All these parts are mounted within a sealed housing 16 with inside surfaces 18 of light absorbing quality such as black anodized aluminum. A cutaway view of the optical accelerometer is shown in FIG. 1. The seismic mass 12 is suspended in the center of the housing 16 by means of a cantilever beam 20. The mass 12 has surface 22 facing light source 10 and the photocells 14 and 15 polished or mirrored such that surface 22 is a good light reflector. Thus, light from source 10 is reflected back onto photocells 14 and 15 which may either generate electric power, or change electrical resistance proportional to the amount of light being absorbed by each cell. To calibrate the device under zero acceleration, an adjusting screw 24 can be turned so as to make the output of each photocell identical. When the device is subjected to acceleration along its axis or direction of sensitivity, the cantilever beam 20 deflects due to the inertial force on the seismic mass 12. The angular deflection of a cantilever beam is proportional to the force on its end for small deflections. Thus, under acceleration, more light is reflected onto one cell and less light onto the other. Therefore, the difference between the electrical output of the two photocells is proportional to the acceleration on the device. In order to make the electrical output a linear function of the applied acceleration, it may be necessary to shape the light collecting surfaces of cells 14 and 15 as shown in FIG. 2. This can be done by masking the exposed surface of the cells with aluminum foil or other suitable means; tolerances need not be close. The cantilever beam 20 can be made such that it is only flexible in the direction of desired sensitivity thus making the device immune to cross axis accelerations. The device is insensitive to changes in temperature since the angular deflection of the cantilever beam is not affected and performance of the photocells is not significantly affected by temperature. The device can also operate so as to be insensitive to variation in light source intensity where only the difference, not the absolute value, of the photocell outputs, across leads 25 and 26, and 27 and 28, is used to measure acceleration.

The optical accelerometer may use any of several types of light sources and photocells as long as the wavelength of the light emitted matches the sensitivity band of the photocells. An optical accelerometer was built using a Gallium Arsenide photo-emitting diode (a Monsanto ME2) which emits infrared light at 9,000 angstroms and silicon photovoltaic (solar) cells which have their peak sensitivity about 9,000 angstroms but capable of sensing light between wavelengths of less than 4,000 and greater than 10,000 angstroms. A less expensive system can be made by using a simple incandescent miniature lamp and Cadmium sulfide photovoltaic cells, both of which operate within the range of the visible spectrum. The means of suspending the seismic mass 12 and mirror 22 need not be restricted to a cantilever beam, but may be any spring mass system which will rotate or translate the mirror under the action of inertial forces created by acceleration along the sensitive axis.

Obviously, many modifications and variations of the present invention are possible in the light of the above teachings. It is therefore to be under-stood that within the scope of the appended claims, the invention may be practiced otherwise than as specifically described.

What is claimed is:

1. An optical accelerometer device that serves as a transducer for providing an electrical signal, which is proportional to the magnitude of the acceleration on the device in the direction of its axis of sensitivity, comprising:
    a. a housing having inside surfaces of light absorbing quality;
    b. a light source mounted at one end of said housing along the axis of sensitivity;
    c. a seismic mass having a light reflective surface thereon facing said light source, suspended within said housing along said axis of sensitivity some distance from said light source;
    d. means for suspending said seismic mass and reflective surface which will translate the reflective surface under action of inertial forces created by acceleration along the axis of sensitivity;
    e. a pair of photocells mounted at said one end of said housing, one on each side of said light source, and having electrical leads therefrom passing through the wall of said housing;
    f. light from said light source being reflected by the reflective surface on said seismic mass onto said photocells for directly generating a signal proportional to the amount of light absorbed by each photocell;
    g. acceleration in the direction of the axis of sensitivity causing the reflective surface on said seismic mass to translate so that the amount of light reflected onto each of the photocells changes, the change in the output of the two photocells being proportional to the acceleration on the device, the light collecting surfaces of said photocells being shaped such that the electrical output is a linear function of the applied acceleration.

2. An optical accelerometer as in claim 1 wherein the signal output from each of said photocells is equal for zero acceleration, and under acceleration, more light is reflected onto one cell and less light onto the other.

3. An optical accelerometer as in claim 1 wherein a calibration means is provided for adjusting the seismic mass and reflective surface for reflection of light onto said photocells.

4. An optical accelerometer as in claim 1 wherein the means for suspending the seismic mass is a cantilever beam which is flexible only in the direction of the axis of sensitivity.

5. An optical accelerometer as in claim 1 wherein said light source is a gallium arsenide photo-emitting diode which emits infrared light at 9,000 angstroms and said photocells are silicon photovoltaic cells which have peak sensitivity at about 9,000 angstroms but capable of sensing light between wavelengths of less than 4,000 and greater than 10,000 angstroms.

6. An optical accelerometer as in claim 1 wherein said light source is a miniature incandescent lamp and said photocells are cadmium sulfide photovoltaic cells.

7. A device as in claim 1 wherein the exposed surfaces of said photocells are masked to provide the desired shape of light collecting surfaces.

8. A device as in claim 1 wherein said seismic mass suspension means is substantially insensitive to cross axis accelerations and changes in temperature so as not to affect the performance of the device.

9. A device as in claim 1 wherein only the difference, and not the absolute value of the photocell outputs, is used to measure acceleration and changes in light source intensity does not affect the performance of the device.

* * * * *